United States Patent [19]
James

[11] Patent Number: 6,035,378
[45] Date of Patent: *Mar. 7, 2000

[54] METHOD AND APPARATUS FOR DYNAMICALLY MONITORING MEMORY PAGE ACCESS FREQUENCY IN A NON-UNIFORM MEMORY ACCESS COMPUTER SYSTEM

[75] Inventor: Larry C. James, West Columbia, S.C.

[73] Assignee: NCR Corporation, Dayton, Ohio

[*] Notice: This patent is subject to a terminal disclaimer.

[21] Appl. No.: 08/991,696

[22] Filed: Dec. 16, 1997

[51] Int. Cl.$^7$ .................................................. G06F 13/00
[52] U.S. Cl. ...................... 711/147; 711/154; 711/156; 711/169; 711/172; 711/163; 709/214
[58] Field of Search ..................................... 711/147, 148, 711/152–4, 169, 170, 173, 156, 163; 709/216, 217, 218, 215

[56] References Cited

U.S. PATENT DOCUMENTS

| | | | |
|---|---|---|---|
| 4,035,778 | 7/1977 | Ghanem | 711/133 |
| 4,450,525 | 5/1984 | Demuth et al. | 711/147 |
| 4,453,209 | 6/1984 | Meltzer | 364/200 |
| 5,193,172 | 3/1993 | Arai et al. | 395/425 |
| 5,269,013 | 12/1993 | Abramson et al. | 395/425 |
| 5,710,907 | 1/1998 | Hagersten et al. | 711/148 |
| 5,721,828 | 2/1998 | Frisch | 709/217 |
| 5,727,150 | 3/1998 | Laudon et al. | 709/215 |
| 5,905,540 | 5/1999 | Miyashita et al. | 348/674 |

*Primary Examiner*—John W. Cabeca
*Assistant Examiner*—Pierre-Michel Bataille
*Attorney, Agent, or Firm*—James M. Stover

[57] ABSTRACT

A method, implemented in hardware, to successively obtain memory access locality information for a large number of contiguous sections of system memory (pages) for the purposes of optimizing memory and process assignments in a multiple-node NUMA architecture computer system including a distributed system memory. Page access monitoring logic is included within each processing node which contains a portion of shared system memory. This page access monitoring logic maintains a plurality of page access counters, each page access counter corresponding to a different memory page address within a specified address range within system memory. Whenever the processing node generates a transaction requiring access to a memory address within the specified address range, the page access monitoring logic increments a count value contained within the page access counter corresponding to the memory address to which access is sought. The specified address range is defined by an address value contained within a range counter. The range counter is initially loaded with a starting address value, defining a first group of page addresses to monitor. This address value is periodically incremented up to a preset maximum address value to define successive groups of page addresses to be monitored. Thus, a record of memory access patterns to successive portions of system memory is created which can be used to optimize memory and process assignments in the computer system.

4 Claims, 5 Drawing Sheets

METHOD AND APPARATUS FOR DYNAMICALLY MONITORING MEMORY PAGE ACCESS FREQUENCY IN A NON-UNIFORM MEMORY ACCESS COMPUTER SYSTEM

RELATED APPLICATIONS

The present application is related to U.S. patent application Ser. No. 08/881,413, entitled METHOD AND APPARATUS FOR DETERMINING MEMORY PAGE ACCESS INFORMATION IN A NON-UNIFORM MEMORY ACCESS COMPUTER SYSTEM, filed on Jun. 24, 1997. This related application is commonly assigned to the assignee of the present application.

The present invention relates to Non-Uniform Memory Access (NUMA) computer systems and, more particularly, to methods for optimizing memory and process assignments in NUMA computer systems.

BACKGROUND OF THE INVENTION

Multiprocessor computer systems can be generally divided into two categories: systems containing multiple processors having a shared common memory or having unshared distributed memories. Systems organized so that all processors have equal access to peripheral devices and shared memory are known as symmetric multiprocessing (SMP) systems. The processors within an SMP system may be connected to peripherals, shared memory and each other through a common bus, a bus hierarchy, a crossbar switch or a multistage network. In addition, the shared system memory may consist of multiple memory elements residing at different locations within the system or network.

In many of the SMP systems referred to above, the interconnection path between the various processors and memory elements may vary, resulting in different memory access times, or memory latencies, for each processor-memory combination. Access to "close" memory (for example, memory packaged on the same board as the processor) is much faster than "distant" memory (memory packaged on another processor board). In classic SMP designs employing uniform memory access (UMA), access to memory is uniformly governed by the speed of distant accesses. Memory access times are established to provide each processor with equal access time to system memory.

In a non-uniform memory access (NUMA) computer architecture, memory access latencies are allowed to differ depending on processor and memory locations. All processors in a NUMA system continue to share system memory, but the time required to access memory varies, i.e., is nonuniform, based on the processor and memory location. The main advantage of NUMA SMP designs over other alternatives to UMA SMA architectures is that, to an application or programmer, the NUMA memory model still appears as traditional SMP shared memory. As a result, NUMA systems can run existing SMP applications without modifications.

In a system wherein processors and memory are organized into two or more nodes, such as the system illustrated in FIG. 1, discussed below, performance of a particular processor is always best if it accesses memory from its own local node rather than from a more remote node. The present invention provides a mechanism to determine access patterns of all nodes in a system so the operating system can make decisions on optimal mapping of memory pages and processes to processors.

OBJECTS OF THE INVENTION

It is therefore an object of the present invention to provide a new and useful method for determining system memory page access patterns in NUMA multiprocessor computer systems.

It is another object of the present invention to provide such a method implemented in hardware within a NUMA multiprocessor computer system.

It is yet another object of the present invention to provide a new and useful method and apparatus for monitoring system bus transactions in a NUMA multiprocessor computer system to identify memory page access patterns in order to optimize mapping of memory pages and processes to processors within the multiprocessor system.

SUMMARY OF THE INVENTION

There is provided, in accordance with the present invention, a multiprocessor computer system comprising a plurality of processing nodes; a shared, distributed system memory; and a communication pathway connecting the plurality of processor nodes. Each processing node within the system includes a processor bus; at least one processor connected to the processor bus; a portion of the shared system memory; and a memory controller coupling the processor bus and communication pathway to the processing node portion of shared memory. The memory controller includes a plurality of page access counters, each page counter corresponding to a different memory page address within a specified address range within system memory; and page access monitoring logic for reading from the processor bus memory page addresses associated with transactions placed unto the bus. Whenever the processing node generates a transaction requiring access to a memory address within the specified address range, the page access monitoring logic increments a count value contained within the page access counter corresponding to the memory address to which access is sought. The specified address range is defined by an address value contained within a range counter. The range counter is initially loaded with a starting address value which defines a first group of page addresses to be monitored. This address is periodically incremented, defined by an interval timer, up to a predetermined maximum address value, to define successive groups of page addresses to be monitored. Compare logic connected to the range counter and to receive the memory page address associated with each transaction generates an enable signal when the memory page address associated with a transaction is contained within the group of page addresses then defined by the range counter which is provided to the page access counters to place them in an operative state.

In the described embodiment, a maximum count register provides a method for defining a page access count threshold. The maximum count register is preloaded with a maximum page access count value, which if reached during the period defined by the interval timer, causes an interrupt to the system. The system can then read the address which exceeded the maximum count threshold, from the hardware. If the maximum count value is not detected for any page access within the initial and maximum range values, the range counter is preset back to the initial value and counting is automatically resumed. There the defined address range is continuously monitored until a page access count exceeds the defined maximum count threshold.

The above and other objects, features, and advantages of the present invention will become apparent from the following description and the attached drawings.

DETAILED DESCRIPTION OF THE PREFERRED EMBODIMENT

Figure 1:
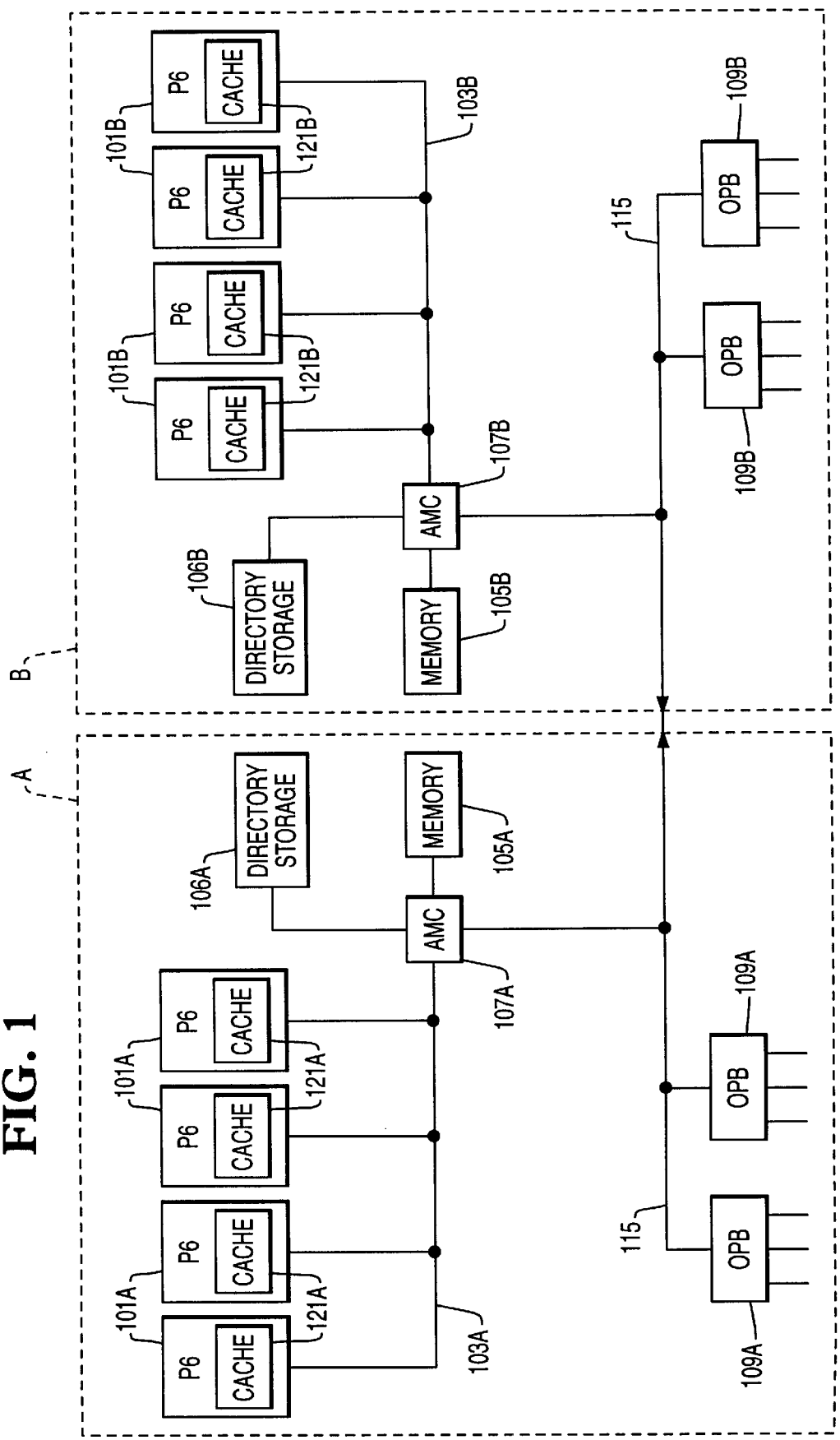
FIG. 1 is a simple block diagram representation of an eight-processor super high volume (SHV) symmetric multiprocessing (SMP) computer system employing a non-uniform memory access (NUMA) architecture.

Referring now to FIG. 1, there is seen an eight-processor SMP system formed of two four-processor building blocks or complexes, identified by reference numerals A and B. Each complex is seen to include identical structure and components, which are identified by reference numerals ending in either an A or a B, for complex "A" and "B", respectively.

The portion of the system contained in complex A is seen to include up to four processors 101A connected to a high-bandwidth split-transaction processor bus 103A. Associated with each processor 301A is a cache memory 321A. A system memory 105A is connected to bus 103A through an advanced dual-ported memory controller 107A. The processor bus 103A is connected to the first port of memory controller 107A. The second memory controller port connects to a high bandwidth I/O bus 115, also referred to herein as an expansion bus, which provides connection for multiple PCI I/O interfaces 109A. All of these components, with the exception of advanced memory controller 107A, are currently available commodity components. For example, processors 101A may be Intel Pentium Pro processors and busses 103A and 115 may be Pentium Pro (P6) bus topology.

The advanced memory controller (AMC) 107A manages control and data flow in all directions between processor bus 103A and I/O bus 115. The I/O bus may contain P6 to PCI I/O Bridges and another AMC ASIC for connectivity to another processor bus, as will be discussed below. The AMC 107A also controls access to a coherent DRAM memory array.

As stated earlier, complex B has a construction identical to complex A. The two complexes are interconnected by expansion bus 115, allowing for communication between the processors 101A and 101B, system memories 105A and 105B, as well as shared I/O devices, cache memories, and other components.

Communication between any one of processors 101A and "close" system memory 105A is provided through processor bus 103A and memory controller 107A, however the communication pathway between any one of processors 101A and "distant" system memory 103B is less direct. The communication pathway between any one of processors 101A and system memory 103B includes processor bus 103A, memory controller 107A, I/O bus 115, and memory controller 105B. Obtaining use of these communication pathway elements will normally result in greater memory access latencies when one of processors 101A requires access to system memory 103B rather than system memory 103A. Similarly, greater memory access latencies should be expected when one of processors 101B requests access to system memory 103A rather than system memory 103B.

Each memory controller 107A and 107B includes logic for monitoring transactions between the local processors 101A and 101B, respectively, and system memory. The monitoring logic, shown in FIG. 2, successively examines memory addresses which appear on the local processor bus, either bus 103A or 103B, to construct a table or histogram which correlates a count of memory page accesses with each page address within a monitored address range occurring within a predefined sample time period.

Figure 2A:
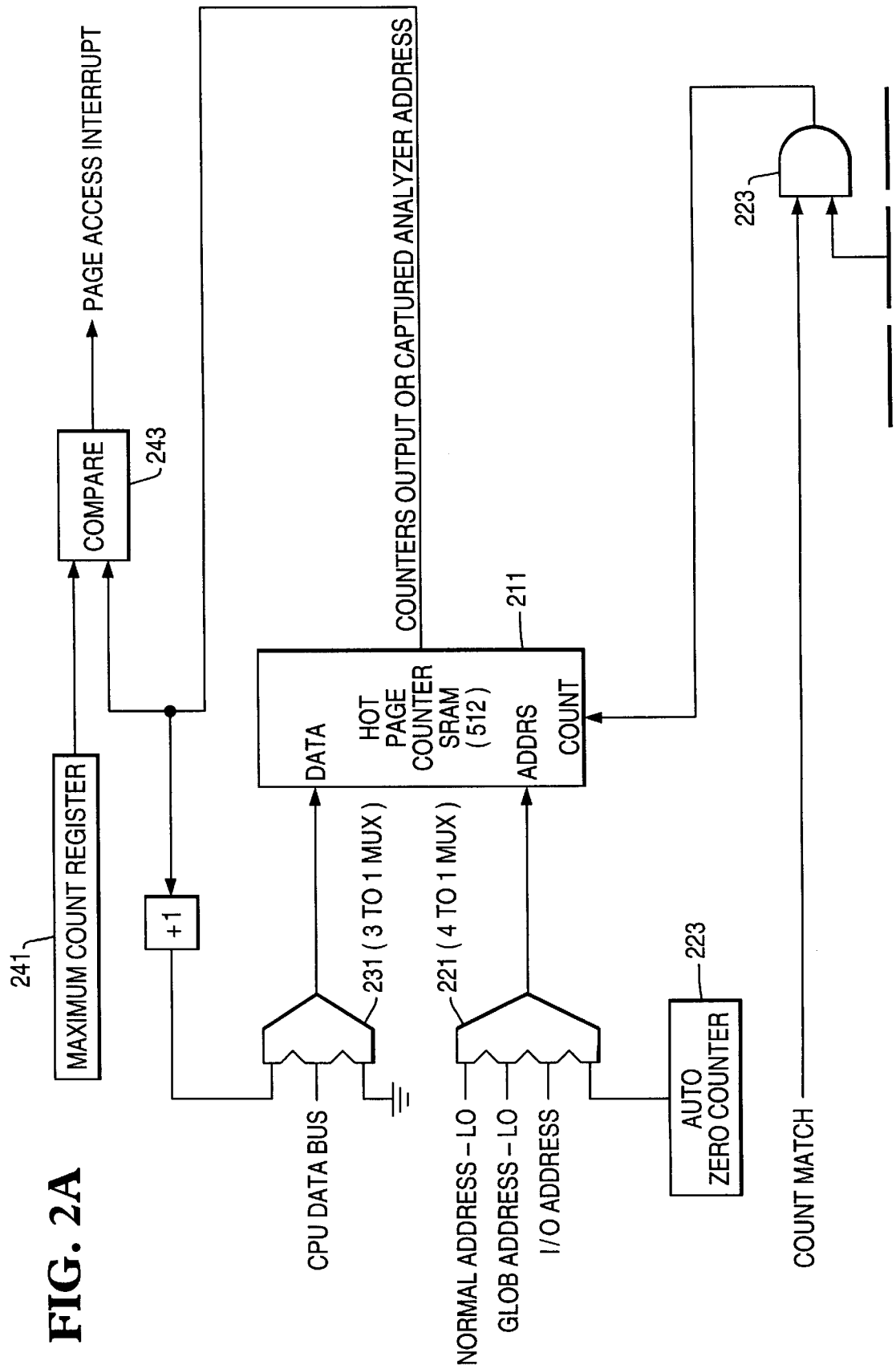
FIGS. 2A and 2B are simple block diagrams representing logic contained within the memory controllers as shown in FIG. 1 for monitoring page accesses in accordance with the present invention.
Figure 2B:
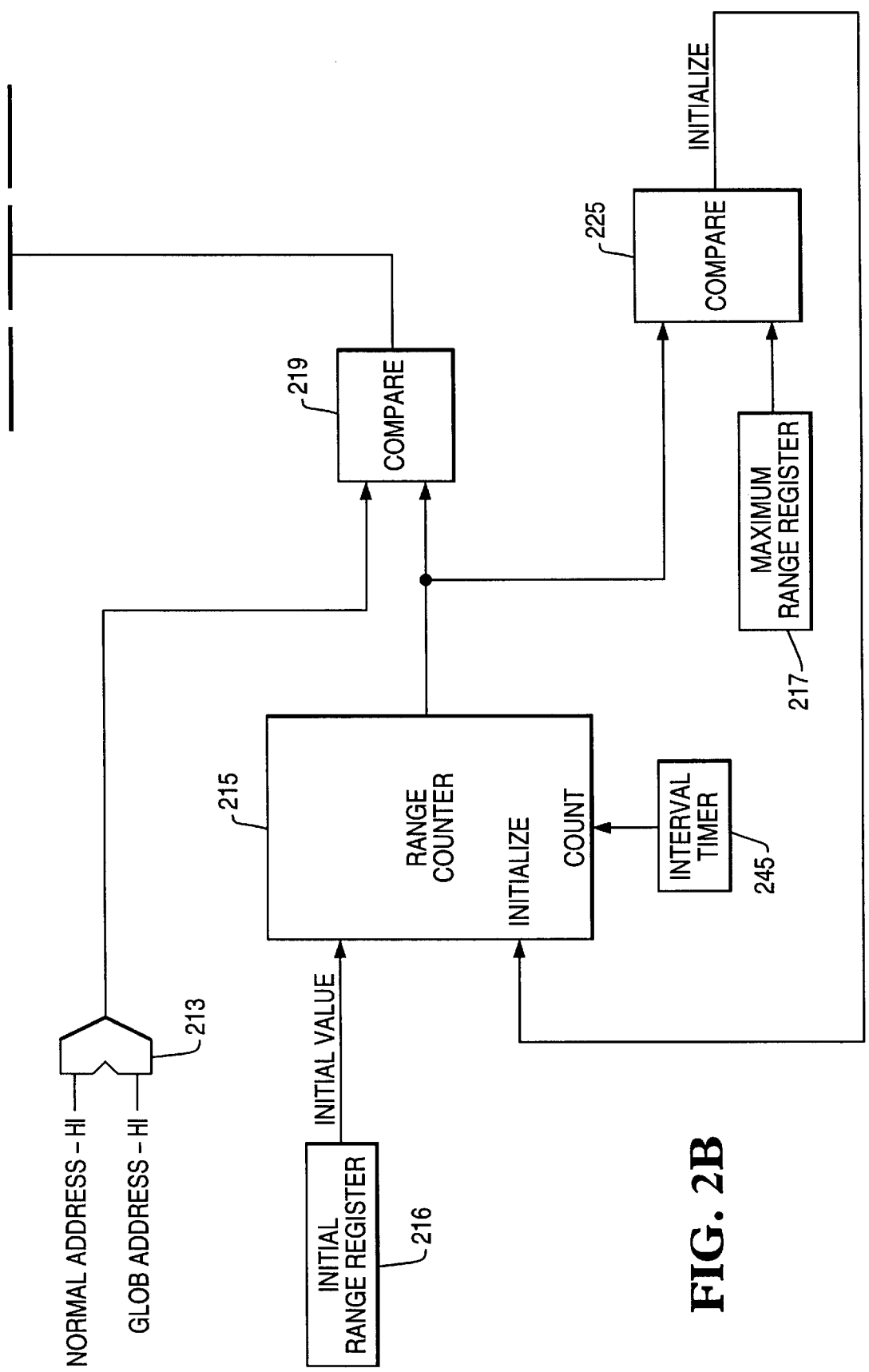

The principal elements of the page access monitoring logic shown in FIG. 2 include a set of page access counters which are implemented with a 512-entry SRAM 211. Within SRAM 211, each page access counter counts the number of accesses to a specific address range (page), and the set of counters operate over a contiguous group of addresses. The ranges of memory page addresses to be counted or monitored is defined by an initial or minimum range register 216, a maximum range register 217, and an address range counter 215. An interval timer counter 245 is implemented to determine the duration of a sample. Also, a programmable maximum count register 241 is provided to determine when to terminate counting as described below.

The monitoring logic further includes a first 2:1 multiplexer 213. Two inputs are provided to multiplexer 213: a normal address, and a glob address, either of which may be selected to be the output of multiplexer 213. The outputs of multiplexer 213 and address range counter 215 are provided to a compare logic circuit 219, the output of which is provided to through an AND gate 223 to a COUNT input of SRAM 211.

A 4:1 multiplexer 221 is connected to provide an address to an address select input (ADDRS) of SRAM 211. Four input signals are provided to multiplexer 221: a normal address, a glob address, a configuration I/O read address, and the output of a zero counter 223.

Output of a 3:1 multiplexer 231 is connected to the data input (DATA) of SRAM 211. Three input signals are provided to multiplexer 231: data from the processor data bus, the output of SRAM 211 incremented by one, or a zero data value.

The output of SRAM 211 and the output of maximum count register 241 are provided to a compare logic circuit 243. The output of compare logic circuit 243 generates an interrupt to the system.

Prior to the start of monitoring operation, initial range register 216 is programmed with the value of the base address for the starting range of addresses to monitor. Similarly, maximum range register 217 is programmed with the value of the base address for the maximum range of addresses to monitor. When the page access monitor logic is initially enabled, address range counter 215 is loaded with the starting base address from initial range register 216, and all the page access counters are reset to a value of zero. In the implementation shown using SRAM 211, each location within SRAM 211 is sequentially accessed through operation of zero counter 223 and set to a value of zero. Monitoring of bus activity then begins.

The address of the active transaction on the processor bus selects a unique page access counter, and the contents of the counter are incremented if the address is in the range specified by address range counter 215. Every transaction on the system bus that is within the range specified by the range counter will increment a specific page access counter. The page access counter typically corresponds to an address range equal to the page size of the operating system, but could be of any granularity. The current implementation has two page size selections: a standard page size of 4K bytes and a 2 Mbytes page size. The larger page size mode, referred to as "Glob Page Mode" is used to perform a quick search of memory for most active sections.

The page access monitoring logic monitors processor bus activity until a particular page access counter exceeds a value programmed into the maximum count register 241. The interval timer determines the period between range samples and can also be read to determine how long it took for the maximum count to occur within a sample period.

Figure 3A:
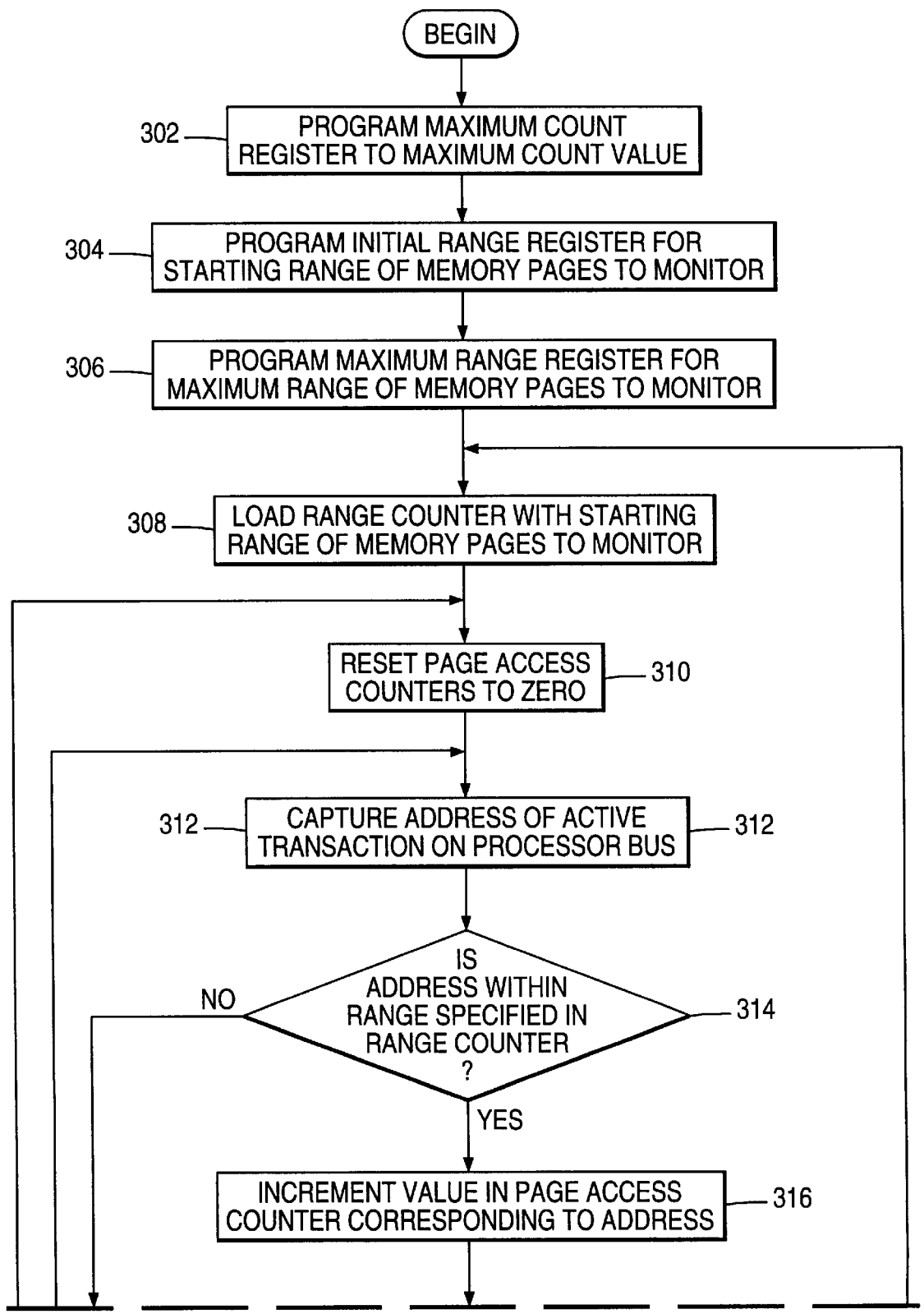
FIGS. 3A and 3B provide a flow diagram illustrating the operation of the page access monitoring logic shown in FIGS. 2A and 2B.
Figure 3B:
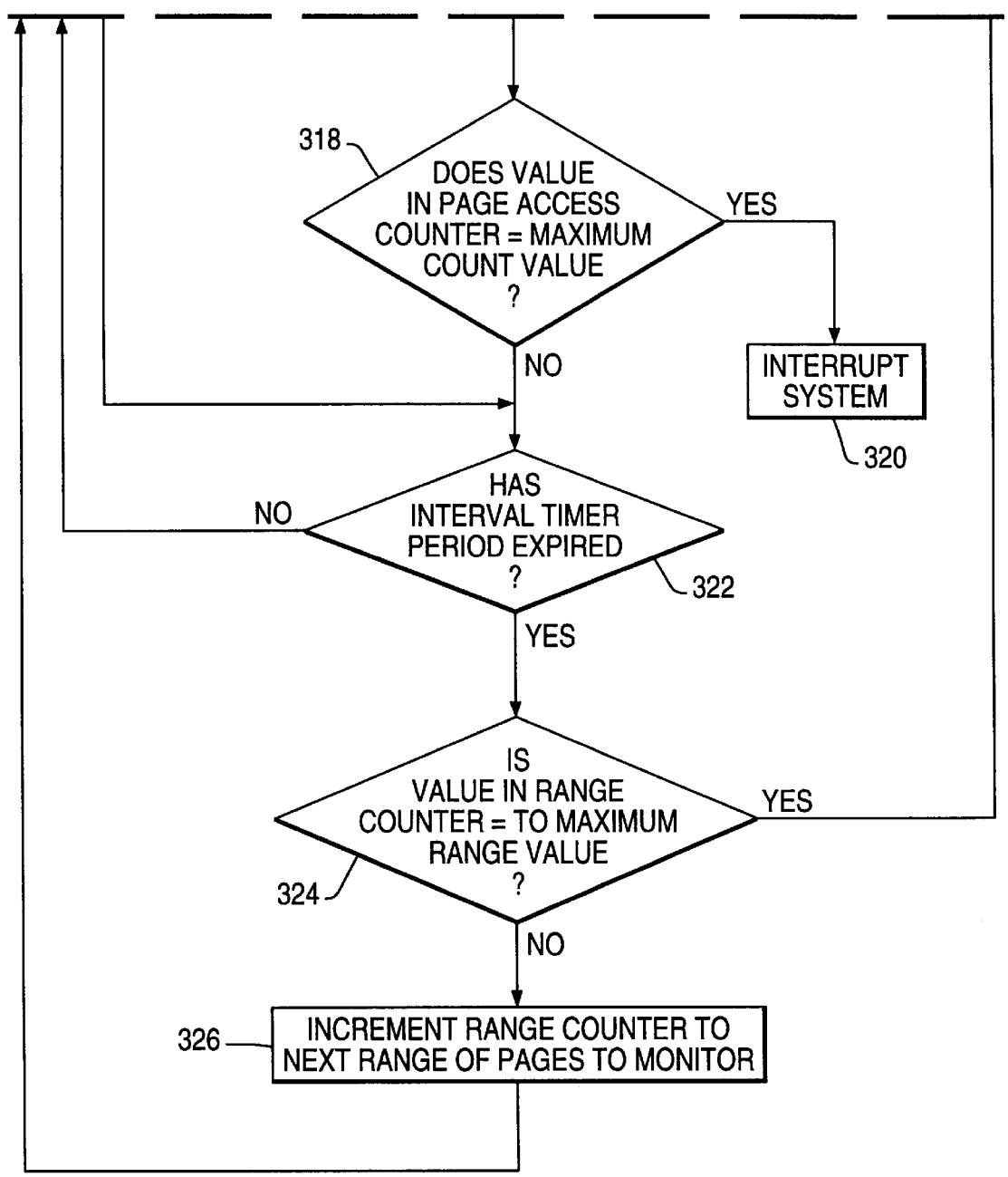

The operation of the page access monitoring logic is illustrated in the flow diagram shown in FIGS. 3A and 3B. At the initiation of the maximum count sample mode of operation, maximum count register 241 is loaded with a maximum page access count value (step 302) which is the number of page accesses permitted to a particular page address, within a period defined by the interval timer, before an interrupt is generated by the monitoring logic. Initial and maximum range registers 216 and 217, respectively, are also programmed with base address values which define the ranges of memory page addresses to be counted or monitored (steps 304 and 306). Address range counter 215 is initially loaded with the starting base address from minimum range register 216 (step 308). Also at this time, the page access counters are reset to each contain a zero count (step 310).

Monitoring transpires with the successive capture of addresses for active transactions as they are presented on the processor bus (step 312). Following the capture of an address, the captured address is compared with the range of addresses specified by range counter 215 (step 314). If the captured address is within the range of addresses specified by the range counter, than the page counter contained within SRAM 211 corresponding to the captured address is incremented by one (step 316). If the captured address is not found to be included in the range of monitored addresses, no additional action takes place concerning the captured address.

Steps 312 through 316 are repeated for successive addresses captured from the processor bus until the count contained within any page access counter grows equivalent to the maximum page access count value contained within maximum count register 241 (step 318) or interval timer 245 expires (step 322). If the maximum count value is reached, the page access monitoring logic will generate an interrupt signal (step 320). Interrupt service routine software can then read the contents of the page access counters to determine which page address exceeded the maximum count value. If the interval timer expires, range counter 215 is then incremented, and the page counters again reset to zero, to allow a new range of pages to be sampled. The process illustrated in steps 312 through 322 will then be repeated for this new range, as well as for subsequent ranges of page addresses until all memory locations included within the ranges of addresses defined by initial and maximum range registers 216 and 217 have been sampled. Once the range specified by the maximum range register is sampled and the maximum count value has not been exceeded, the range counter is automatically reset to the initial range register value and the algorithm is repeated continuously.

It can thus be seen that there has been provided by the present invention a new and useful method, implemented in hardware, for determining excessive system memory page access rates to remote memory nodes which facilitates remapping of memory pages and processes in order to optimize system performance.

Although the presently preferred embodiment of the invention has been described, it will be understood that various changes may be made within the scope of the appended claims.

What is claimed is:

1. A multiprocessor computer system comprising:

a plurality of processing nodes;

a shared, distributed system memory; and a communication pathway connecting said plurality of processing nodes;

wherein each one of said processing nodes includes:

at least one processor;

a portion of said shared system memory coupled to said processor and said communication pathway;

a plurality of page access counters, each one of said page access counters corresponding to a different memory page address within said shared system memory; and system memory page access monitoring logic connected to said processor for reading a memory page address associated with a transaction initiated by said processor and incrementing a value maintained within the page access counter corresponding to the memory page address associated with said transaction;

said system memory page access monitoring logic including:

a range counter initially loaded with a starting address value which defines a first group of page addresses to be monitored, the address value contained within said range counter being incremented at predetermined intervals, each incremental address value defining another group of page addresses to be monitored, the address value contained within said range counter being incremented until said address value equals a maximum address which defines a final group of page addresses to be monitored;

compare logic connected to said range counter and to receive the memory page address associated with said transaction, said compare logic generating an enable signal when the memory page address associated with said transaction is contained within the group of page addresses defined by said range counter;

said page access counters being connected to receive said enable signal and responsive thereto to be placed in an operative state during receipt of said enable signal;

a maximum count register containing a maximum page access count value which is the number of page accesses permitted to any page address within said shared memory;

said compare logic for comparing the maximum page access count value contained within said maximum count register with the values maintained within said page access counters and generating an interrupt signal when the value maintained within one of said page access counters equals said maximum page access count value; and control logic connected to receive said interrupt signal and responsive thereto to:

read the contents of the page access counters into system memory;

clear the values stored within said page access counters; and increment the address value contained within said range counter.

2. A multiprocessor computer system comprising:

a plurality of processing nodes;

a shared, distributed system memory; and a communication pathway connecting said plurality of processing nodes;

wherein each one of said processing nodes includes:

at least one processor;

a portion of said shared system memory coupled to said processor and said communication pathway;

a plurality of page access counters, each one of said page access counters corresponding to a different memory page address within said shared system memory; and system memory page access monitoring logic connected to said processor for reading a memory page address associated with a transaction initiated by said processor and incrementing a value maintained within the page access counter corresponding to the memory page address associated with said transaction;

said system memory page access monitoring logic including:

a range counter initially loaded with a starting address value which defines a first group of page addresses to be monitored, the address value contained within said range counter being incremented at predetermined intervals, each incremental address value defining another group of page addresses to be monitored, the address value contained within said range counter being incremented until said address value equals a maximum address which defines a final group of page addresses to be monitored; and compare logic connected to said range counter and to receive the memory page address associated with said transaction, said compare logic generating an enable signal when the memory page address associated with said transaction is contained within the group of page addresses defined by said range counter;

said page access counters being connected to receive said enable signal and responsive thereto to be placed in an operative state during receipt of said enable signal;

an interval timer for determining the predetermined intervals at which the address value contained within said range counter is incremented; and control logic connected to receive a interrupt signal and responsive thereto to:

read the contents of the page access counters into system memory reset said interval timer;

clear the values stored within said page access counters; and increment the address value contained within said range counter.

3. In a multiprocessor computer system comprising a plurality of processing nodes; a shared, distributed system memory; and a communication pathway connecting said processing nodes; wherein each one of said processing nodes includes at least one processor; and a portion of said shared system memory coupled to said processor and said communication pathway; a method for monitoring memory page accesses to said shared system memory; the method comprising the steps of:

a) establishing a sampling time period;

b) defining a first group of memory page addresses within said shared system memory to be monitored;

c) defining at least one additional group of memory page addresses within said shared system memory to be monitored;

d) maintaining a plurality of page access counters, each one of said page access counters corresponding to a different memory page address within said first group of memory page addresses;

e) successively capturing memory page addresses for active transactions as the transactions are presented by said processors;

f) for each captured memory page address which is contained within said first group of memory page addresses, incrementing a value maintained within the page access counter corresponding to said captured memory page address;

g) continuously repeating steps e) and f) until the expiration of said sampling time period;

h) following the expiration of said sampling time period, reading the contents of the page access counters into system memory;

i) clearing the count values stored within said page access counters;

j) restarting said sampling time period; and k) repeating steps d) through j) for each one of said at least one additional groups of memory page addresses within said shared system memory to be monitored.

4. In a multiprocessor computer system comprising a plurality of processing nodes; a shared, distributed system memory; and a communication pathway connecting said processing nodes; wherein each one of said processing nodes includes at least one processor; and a portion of said shared system memory coupled to said processor and said communication pathway; a method for monitoring memory page accesses to said shared system memory; the method comprising the steps of:

a) establishing a maximum count value;

b) defining a first group of memory page addresses within said shared system memory to be monitored;

c) defining at least one additional group of memory page addresses within said shared system memory to be monitored;

d) maintaining a plurality of page access counters, each one of said page access counters corresponding to a different memory page address within said first group of memory page addresses;

e) successively capturing memory page addresses for active transactions as the transactions are presented by said processors;

f) for each captured memory page address which is contained within said first group of memory page addresses, incrementing a value maintained within the page access counter corresponding to said captured memory page address;

g) comparing the last-incremented value maintained within said page access counters with said maximum count value;

h) continuously repeating steps e) through g) until said last-incremented value maintained within said page access counters equals said maximum count value;

i) reading the contents of the page access counters into system memory;

j) clearing the count values stored within said page access counters; and k) repeating steps d) through j) for each one of said at least one additional groups of memory page addresses within said shared system memory to be monitored.

* * * * *